Nov. 17, 1925.  1,561,816
H. AUSTIN ET AL.
TONNEAU WINDSHIELD
Filed June 27, 1924 2 Sheets-Sheet 1
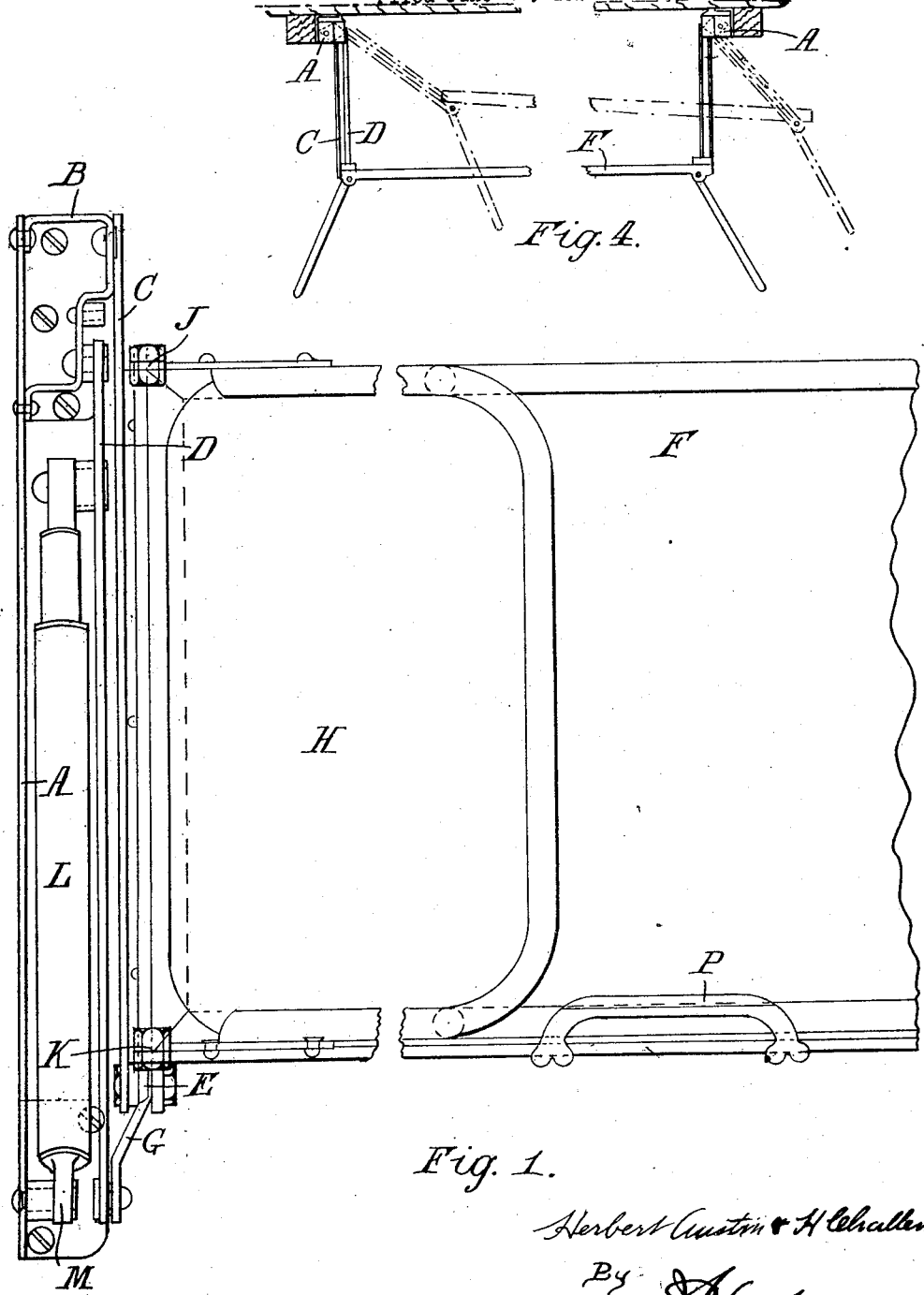

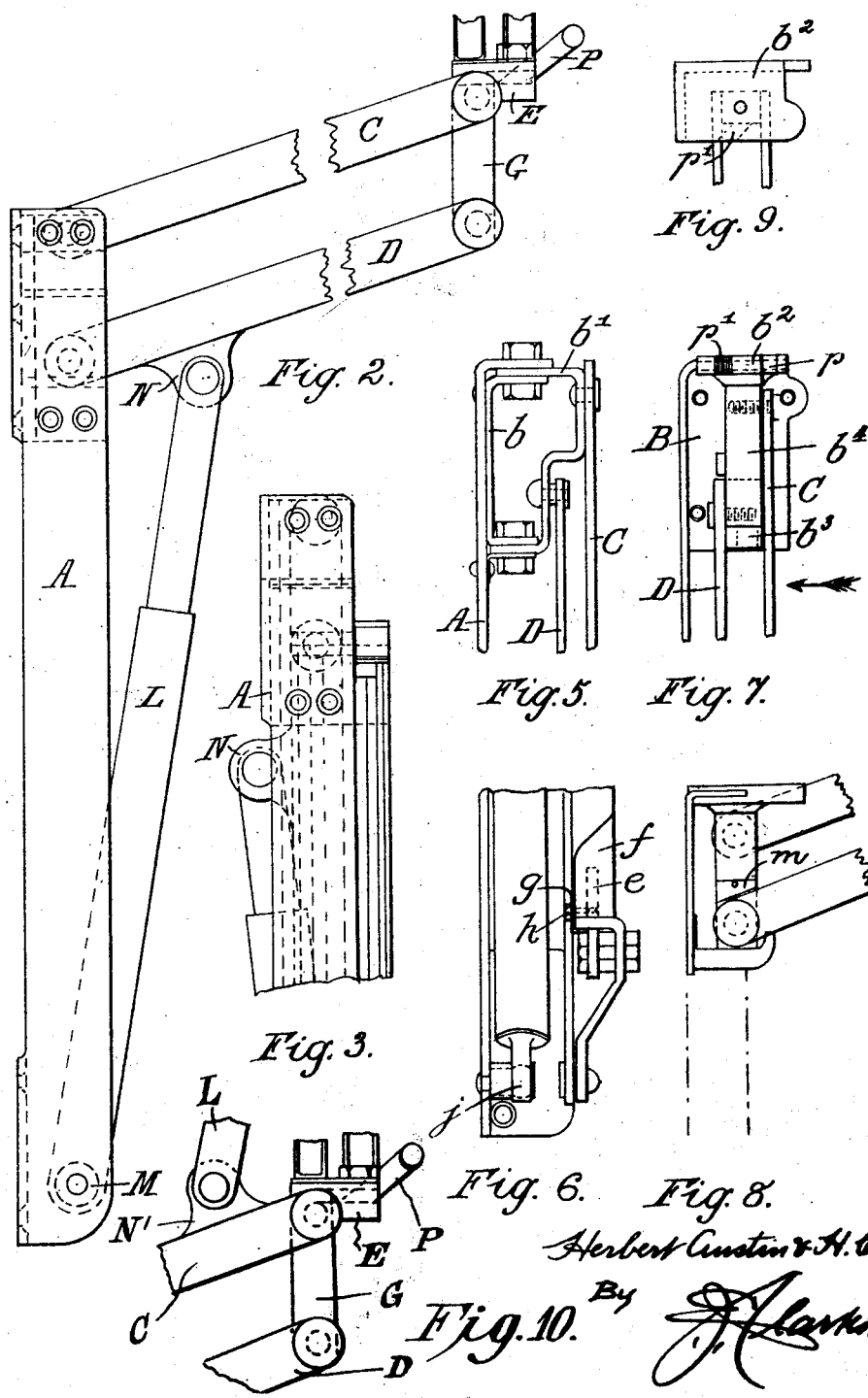

Patented Nov. 17, 1925.

1,561,816

UNITED STATES PATENT OFFICE.

HERBERT AUSTIN, OF BROMSGROVE, AND HERBERT CHALLENOR, OF NORTHFIELD, ENGLAND; SAID CHALLENOR ASSIGNOR TO SAID AUSTIN.

TONNEAU WINDSHIELD.

Application filed June 27, 1924. Serial No. 722,792.

*To all whom it may concern:*

Be it known that we, HERBERT AUSTIN, a knight of the British Empire, and a British subject, residing at Bromsgrove, in the county of Worcester, England, and HERBERT CHALLENOR, a British subject, residing at Northfield, in the said county, have invented certain new and useful Improvements in Tonneau Windshields, of which the following is a specification.

This invention relates to folding wind screens for motor vehicles and like purposes, and more especially to wind screens which are used with the rear seats of motor vehicles, and are required to be folded against the rear of the front seats when not required for use; and the main object of the invention is to provide a construction which can be very readily set up and folded down and occupies, when folded down, only a very small amount of space.

A screen constructed according to this invention is described by reference to the drawings herewith, of which:—

Figure 1 (Sheet 1) is a view of one side of the wind screen shown as folded down, such as against the back of the front seat of a motor vehicle.

Figure 2 (Sheet 2) is an edge view of the screen, shown partly broken away and in the raised position.

Figure 3 is a fragmentary view showing the upper end of one of the standards and illustrating the screen as folded down.

Figure 4 (Sheet 1) is a somewhat diagrammatic view, to a reduced scale, to illustrate a modification of the invention.

Figures 5 and 6 are respectively views, to the same scale as Figures 1 to 3, to illustrate certain details of such modification.

Figure 7 is a view corresponding to Figure 5; but showing a modification thereof.

Figure 8 is a view looking in the direction of the arrow of Figure 7.

Figure 9 is a plan view of the arrangement shown in Figure 7.

Figure 10 is a view showing a slight modification of the invention.

Referring first to Figures 1, 2 and 3, A represents one of a pair of standards or brackets placed one at each side of a motor vehicle, and preferably upon the back of the front seat. To the upper end of the standard is fixed a bracket B to which are pivoted two parallel bars C and D. The bar C is pivoted at what is its lower end when folded down to a bracket E (see Figure 1) at the base of the corresponding side of the wind screen proper F, and the other bar D is pivoted to a downward extension G of the bracket E. H is one of a pair of wings or side screens pivoted at J and K (see Figure 1) to turn in relation to the main part of the screen. L is a telescopic compression spring box pivoted at its lower end to the standard A at the point M and pivoted at its upper end to a projection N of the bar D, said projection extending forwardly of the screen when the latter is folded down and downwardly when the screen is set up.

It will be seen by reference to Figure 3 that, when the screen is folded down in relation to the standards, it and the parallel bars are brought into substantially the same plane with the standards; and, owing to the fact that the connection of the spring box L at its upper end to the projection N lies forwards of the plane in which lie the pivoted connections of the parallel bars with the standards, the tendency of the spring box is to press the screen forwards whereby the screen is retained in its folded position.

The screen is provided with a handle P by which it may be raised and it will be seen by reference more especially to Figure 3 that, when the screen has been raised a short distance, the pivot connection of the spring box L with the projection N comes to the rear of the plane in which the bars are pivoted to the standards, so that the tendency is for the spring box to press the screen up to its fully raised position.

In Figures 4, 5 and 6 there is illustrated a modification of the invention in which the screen proper is arranged to be moved to either side, when set up, in order to allow passengers readily to enter the vehicle and occupy the back seat. It will be seen on reference to Figures 5 and 6 that in this modification the top bracket B is formed in two parts, of which the one part $b'$ is pivoted to the other part $b$, the latter being fixed to the standard A. The bracket E in this case, instead of being rigid with the wind screen, is pivoted thereto, being provided with a pivot stump $e$ to enter a hole in a boss $f$ of the screen proper. The latter is retained in relation to the bracket E by means of a small angle plate *g* secured by a set screw *h;* and, as an added security, the nose end of the set screw may enter a groove in the stump *e*.

The above arrangement allows of the wind screen being moved to either side, for instance as indicated by broken lines in Figure 4, the portion *b'* of the bracket B turning about its pivot axis with the portion *b;* and the bracket E turning about its pivot stump *e* in relation to the wind screen. As the spring box L will have to move to a certain extent laterally in relation to its lower pivot axis the latter is formed spherical as seen at *j* at the foot of Figure 6.

Referring to Figures 7, 8 and 9, there is there illustrated a somewhat modified form of the bracket B. In this case the portion *b* of Figure 5 is replaced by two plates $b^2$ $b^3$ and between these is a pivotal block $b^4$ to which the arms C and D are pivoted. *m* (Figure 8) is a stop to limit the upward movement of the arm D, and *p* is a notch formed in the plate $b^2$ adapted to receive the arm C, as shown in Figure 8, and so keep the screen from moving from side to side. When it is required to move the screen to one side, however it can be lowered against the force of the spring box sufficiently to bring the arm C out of the notch *p*. When it has been moved to one side the arm C may enter a second notch *p'* so as to retain the screen in such position.

In lieu of connecting each of the spring boxes at its upper end to the bar D and at its lower end to one of the standards, as clearly indicated in Figure 2, a similar effect may be obtained by pivoting each spring box at its lower end to an upward projection N' of the bar C; and this is indicated in Figure 10, the spring box being pivoted at its upper end to the screen proper. Such an arrangement has the same effect as before, because, when the screen is set up, the spring box tends to keep it so, whereas when the screen is folded down between the standards the pivot point Q, by then coming rearwards of the plane of the screen proper, tends to press the latter forwards and so retain the screen in the folded down position.

Having fully described our invention what we claim and desire to secure by Letters Patent is:—

1. The combination with a fixed part of a vehicle of a pair of screen supporting arms pivoted to said parts with their pivots in axial alinement, a screen supported by the free ends of said arms, lugs projecting from said arms in the plane of their rotation, and telescopic compression members spring urged to expanded position and each having one end pivoted to a respective lug and its other end pivoted to the fixed part in such position that the lug pivot swings on one side of a line drawn between the remaining pivots upon the screen being raised and to the other side of said line upon the screen being depressed.

2. The combination with a fixed part of a vehicle of a pair of screen supporting arms pivoted to said parts with their pivots in axial alinement, a screen supported by the free ends of said arms, lugs projecting from said arms in the plane of their rotation, telescopic compression members spring urged to expanded position and each having one end pivoted to a respective lug and its other end pivoted to the fixed part in such position that the lug pivot swings on one side of a line drawn between the remaining pivots upon the screen being raised and to the other side of said line upon the screen being depressed, and other arms connecting said screen and fixed part in parallel relation to the first arms.

3. A wind screen for motor vehicles and like purposes, comprising a screen proper, a pair of supports, a bracket in respect of each support pivoted thereto, a pair of parallel arms pivoted at their inner ends to said bracket, a pivoted bracket in respect of each side of the screen proper and to which the outer ends of said parallel arms are pivoted, said brackets of the supports and of the wind screen being adapted to turn about vertical axes thereof whereby the wind screen proper can be swung to one side or the other, such as to facilitate the entry of persons to the back seat of a motor vehicle, and a spring adapted when the screen is set up to keep it so.

4. A wind screen for motor vehicles and like purposes comprising a screen proper, a pair of supports, a bracket in respect of each support pivoted thereto, a pair of parallel arms pivoted at their inner ends to said bracket, a pivoted bracket in respect of each side of the screen proper and to which the outer ends of said parallel arms are pivoted, said brackets of the supports and of the wind screen being adapted to turn about vertical axes thereof, whereby the wind screen proper can be swung to one side or the other, such as to facilitate the entry of persons to the back seat of a motor vehicle, a plate in respect of each support placed immediately over one of the arms and being notched in such a manner that the said arm, when the screen is set up, lies within a notch and is thereby retained in any position to which it has been moved laterally, and a spring in respect of each pair of arms adapted when the screen is set up to keep it so.

In witness whereof we have hereunto signed our names this fourth day of June 1924.

HERBERT AUSTIN.
HERBERT CHALLENOR.